Patented Aug. 5, 1941

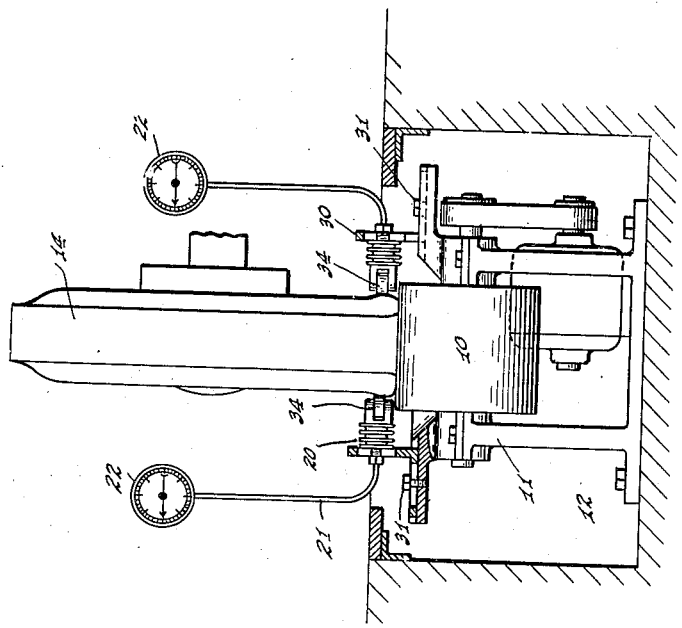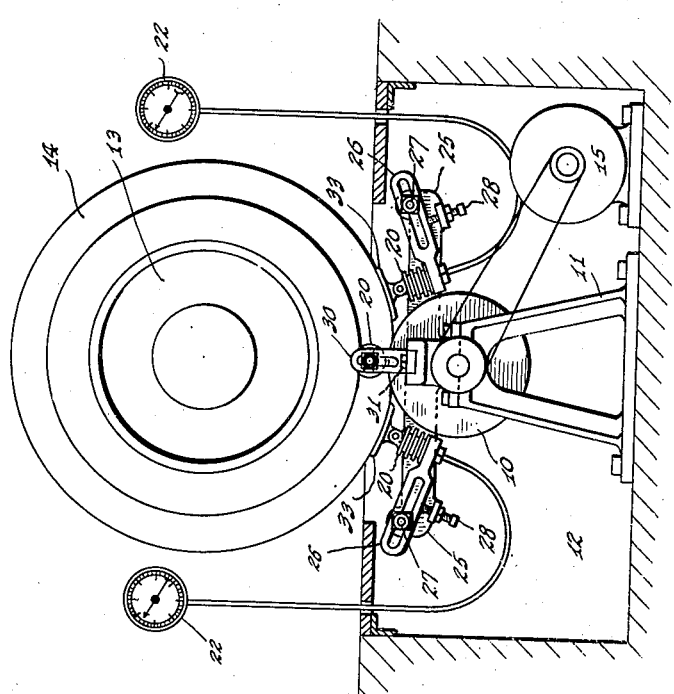

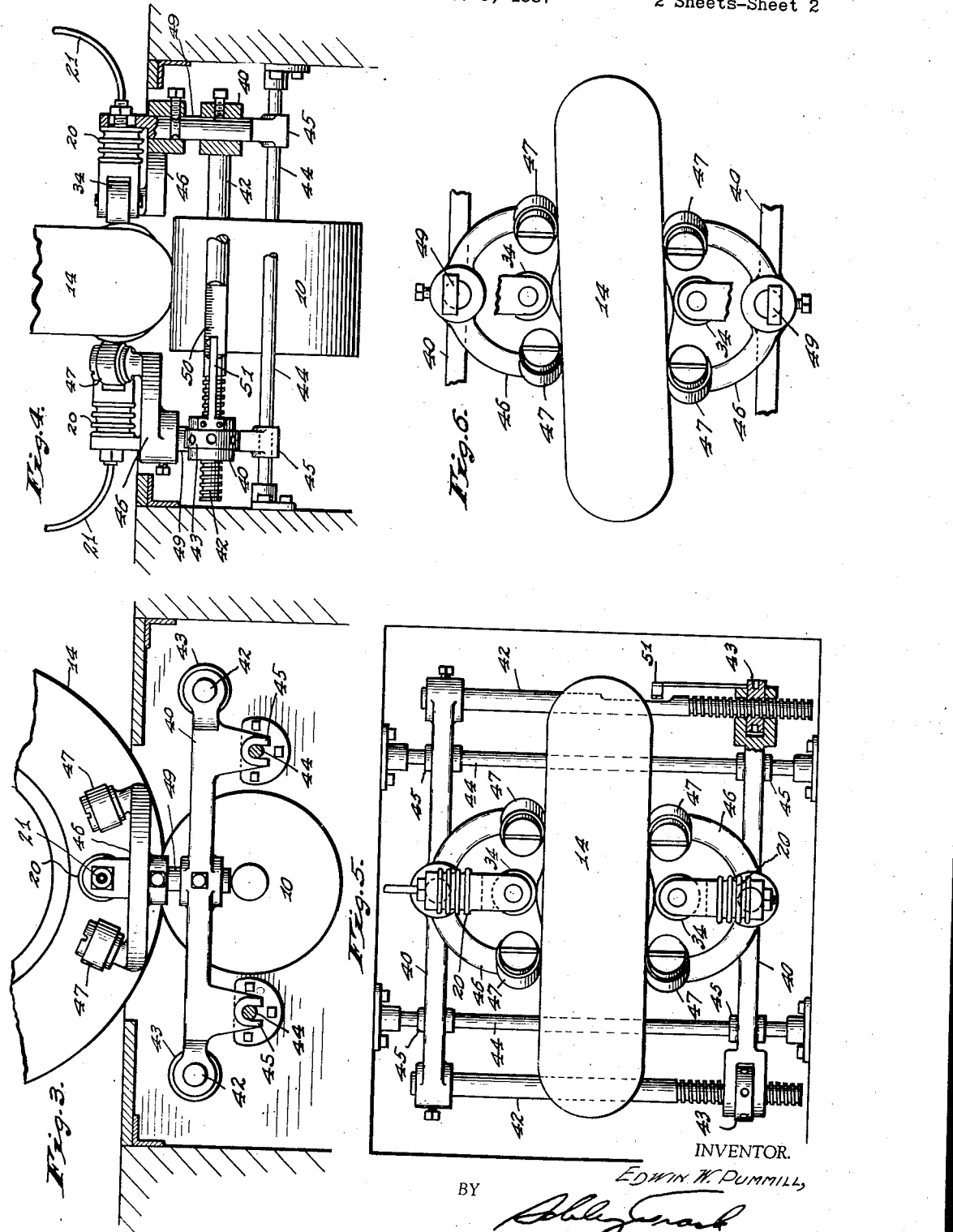

2,251,803

UNITED STATES PATENT OFFICE 2,251,803

TIRE TESTER

Edwin W. Pummill, Indianapolis, Ind.

Application December 9, 1937, Serial No. 178,841

12 Claims. (Cl. 73—51)

It is the object of my invention to test the casings of automobile tires for structural defects or injuries not apparent on their exterior surfaces. A further object of my invention is to test a tire casing for defects or injuries while the casing is in place on the wheel and the wheel in place on the automobile.

In carrying out my invention, I progressively measure throughout the circumference of the casing the displacement which occurs when the casing is subjected to stress. The presence of defects or injuries within the casing is made evident by an abnormal displacement at or in the vicinity of the defect or injury. The stress to which the casing is subjected is desirably a stress sustained in operating conditions, such as the stress resulting from centrifugal force, the stress which occurs at the point of engagement between the tire and the supporting surface, or both.

Conveniently, the device I employ in conducting the test embodies a roller rotatable about a horizontal axis at variable speeds. The casing to be tested is brought into engagement with this roller under a load which, at least approximately, duplicates operating conditions; and suitable indicating devices are then brought into contact with the outer surface of the casing at selected points. The roller is then rotated to cause rotation of the tire, and any abnormal distortions of the casing are registered on one or more of the indicating devices.

The accompanying drawings illustrate simple embodiments of my invention: Figs. 1 and 2 are respectively side and end elevations of a tire-testing mechanism showing an automobile wheel and tire in association therewith; Figs. 3 and 4 are side and front elevations respectively of a modified construction; Fig. 5 is a plan view of the structure shown in Figs. 3 and 4; and Fig. 6 is a fragmental plan view similar to Fig. 5 but illustrating the apparatus in association with an improperly mounted tire.

In the device shown in Figs. 1 and 2 a roll 10 is supported on suitable bearings 11 within a pit 12 so that an automobile can be placed with its wheel 13 directly above the roll and with the tire 14 on the wheel 13 in engagement with the roll under approximately the conditions encountered in actual use. The roll 10 is operatively connected to a driving means, such as an electric motor 15, which is desirably of the variable-speed type.

At various points indicating mechanism are brought into contact with the tire casing. As shown in the drawings, the indicating mechanisms employed are hydraulic in character, each embodying a Sylphon bellows 20 connected through a tube 21 to a pressure gage 22; but it is to be understood that I do not limit myself to any particular kind of indicating mechanism. As shown in Figs. 1 and 2, four of the indicating devices are employed, two arranged to bear against the tread of the tire on opposite sides of the roll 10 and two arranged to bear against opposite side walls of the tire immediately above the axis of the roll 10 at a point where flattening of the tire under load is greatest.

The means employed for supporting the various bellows 20 may vary, and the means illustrated in the drawings are to be understood as merely examples. In Figs. 1 and 2, the frame 11 is provided with a pair of oppositely extending arms 25 to which there are respectively bolted adjustable supports 26. Desirably, the bolt 27 which holds each of the supports 26 in position passes through a slot in the associated support so that the bellows 20, carried by the support, can be moved toward or away from the roll 10. The angular position of each support about its associated bolt 27, which position determines the normal pressure within the bellows 20, may be controlled by an adjustable screw 28.

Each of the bellows 20 disposed at the side of the tire is shown in the drawings as mounted upon an angle bracket 30 which is provided with a slot for the reception of a screw 31 by which it is secured to the frame 11, the slots being arranged to permit adjustments of the bracket toward or away from the tire. The bellows 20 associated with each angle bracket 30 is desirably connected to such bracket through a slotted connection so that its vertical position can be varied.

Each of the bellows is provided with a suitable tire-engaging element. Those of such elements which are to engage the corrugated tread of the tire are desirably in the form of shoes 33 having a sufficient extent circumferentially of the tire to bridge any transverse grooves in the tread. Those elements which engage the side wall or other smooth portions of the tire may be in the form of rollers 34.

In operating a device such as that described, the automobile is first located to position the tire to be tested in contact with the roll 10, as indicated in the drawings. The bellows-supports 26 and 30 are adjusted to bring the elements 33 and 34 into contact with the tire with a pressure which will be recorded by the respective gages 22. The motor 15 is then placed in operation to rotate the roll 10 and wheel 13 slowly. In a sound tire properly positioned on its associated wheel 13, the readings given by the respective gages 22 will not vary materially as the tire rotates; but if there are any internal defects, such as a break in the fabric of the tire casing, the distortion of the tire under a load applied in the vicinity of such a defect will be of an abnormal extent and will be registered on one or the other of the gages.

As shown in the drawings, all the indicating devices are arranged to indicate casing-distortion resulting from a load; but if desired, an indicating device can be brought into association with the tire 13 at a point remote from the roll 10 and the motor 15 operated at a high rate of speed to determine the presence of any abnormal distortion occurring as the result of any centrifugal force.

In the structure illustrated in Figs. 1 and 2, fluctuation in the gages 22 connected to the tire-engaging elements 34 does not necessarily indicate any imperfections in the tire; for, if a perfectly sound tire were mounted on its associated wheel in a plane not perpendicular to the wheel-axis, rotation of the tire would cause movement of the elements 34 and corresponding fluctuations in the gages 22 respectively associated therewith. To eliminate the effect of improper tire mounting upon movements of the side-wall engaging elements of my device the construction illustrated in Figs. 3 to 6 may be employed. Here, instead of mounting the elements 34 from stationary supports, I mount them on a floating carriage which is free to move in a direction parallel to the wheel axis and whose position along such path of movement is controlled by elements which engage the tire at points spaced circumferentially from the distortion created by the roll 10.

In the particular arrangement illustrated in Figs. 3 to 6, the floating carriage referred to comprises a pair of cross members 40 which are interconnected by rods 42 and which are relatively adjustable longitudinally of such rods to vary the distance between them. Conveniently, one end of each of the rods 42 is threaded for the reception of a nut 43 which, while rotatable relatively thereto, is held in fixed axial position relative to one of the cross members 40. The carriage comprising the cross members 40 and rods 42 is mounted for sliding movement on stationary guide rods 44 which are supported in any convenient manner and received in suitable bearings 45 in the cross members 40.

To control the position of the sliding carriage on the rods 44, there is pivoted to each cross member 40 a yoke 46 which carries at its ends rollers 47 positioned to engage the adjacent side wall of the tire 14. The rolls 47 are spaced a sufficient distance apart to bridge that portion of the adjacent side-wall of the tire which is distorted by reason of engagement between the tire and the roll 10, and the rolls 47 therefore engage undistorted portions of the side-walls of the tire.

As in the other modification of my invention described, each roll 34 is mounted upon one end of a flexible bellows 20 which in turn is supported from one of the cross members 40 of the floating carriage. Conveniently, each yoke 46 is mounted on a post 49 which is vertically adjustable in the associated cross member 40 and on the upper end of which the associated bellows 20 is mounted. Vertical adjustment of the posts 49 enables the rolls 34 to be brought into engagement with the side walls of the tire at the point of maximum distortion, irrespective of the tire diameter.

In utilizing the device illustrated in Figs. 3 to 6, the nuts 43 are adjusted until all four of the rolls 47 engage the side walls of the tire. If the tire is mounted on its associated wheel in a plane not perpendicular to the wheel-axis, rotation of the wheel will cause the carriage 40—42 to slide back and forth on the rods 44, maintaining substantially a constant position relative to the median plane of the tire. If the tire is free from imperfections, the amount of side-wall distortion resulting from engagement between the tire and the roll 10 will be substantially constant throughout the circumference of the tire, and the gages 22 respectively connected to the bellows 20 will not fluctuate materially. However, any defect in the side wall of the tire will, as previously pointed out, result in an increased side-wall distortion which will immediately be made evident by a fluctuation in one or the other of the gages 22 when the defect passes the associated roll 34.

For many tires, the amount of side-wall distortion which is produced under normal load when the tire is inflated to known pressure is known; and any material variation from this known distortion indicates a departure of the tire from normal. The device illustrated in Figs. 3 to 6 may be adapted for measuring the amount of side-wall distortion by applying to one of the rods 42 a scale 50 and to the adjustable cross member 40 a pointer or index 51 co-operating with such scale. Through the use of the scale, the rolls 47, or the rolls 34, may be employed as calipers to measure the axial thickness of the tire both in distorted and undistorted conditions.

I claim as my invention:

1. Mechanism for testing tire-casings, comprising a roller, means for supporting said roller and holding it in contact with the tread surface of said casing with sufficient pressure to distort the casing, a pair of indicating devices having elements engaging the tread surface of the casing on opposie sides of said roller, a second pair of indicating devices having elements engaging the side wall of the casing at points of maximum distortion, and means for rotating said roller to cause rotation of the casing past the casing-engaging elements of said indicating devices.

2. Mechanism for testing tire-casings, comprising a roller, means for supporting said roller and holding it in contact with the tread surface of said casing with sufficient pressure to distort the casing, a pair of indicating devices having elements engaging the side wall of the casing at points of maximum distortion, and means for rotating said roller to cause rotation of the casing past the casing-engaging elements of said indicating devices.

3. Mechanism for testing tire-casings, comprising a roller, means for supporting said roller and holding it in contact with the tread surface of said casing with sufficient pressure to distort the casing, a pair of indicating devices having elements engaging the tread surface of the casing on opposite sides of said roller, and means for rotating said roller to cause rotation of the casing past the casing-engaging elements of said indicating devices.

4. A process of testing pneumatic tire-casings, comprising applying a substantially constant localized load continuously and progressively about the circumference of the casing and continuously measuring the distortion of the casing at a point adjacent said load and in fixed position relative thereto.

5. In mechanism for testing rotatably mounted pneumatic tire-casings, a member engaging the tread surface of said casing with sufficient pressure to distort the casing, a carriage mounted for sliding movement in a path parallel to the casing axis, means for locating said carriage along its path of movement and engaging the casing at a point spaced from the distortion created by said member, and an indicating device having an element movably mounted on said carriage and engaging the distorted portion of the casing.

6. In mechanism for testing rotatably mounted pneumatic tire-casings, a member engaging the tread surface of said casing with sufficient pressure to distort the casing, a carriage mounted for sliding movement in a path parallel to the casing axis, means for locating said carriage along its path of movement and engaging opposite sides of the casing at points spaced from the distortion created by said member, and an indicating device having an element movably mounted on said carriage and engaging the distorted portion of the casing.

7. In mechanism for testing rotatably mounted pneumatic tire-casings, a movable member engaging said casing as it rotates, an element movably mounted on said member and engaging the casing at a point spaced from the point of engagement between said member and the casing, and indicating means for indicating any relative movement of said member and element as the casing is rotated.

8. In mechanism for testing pneumatic tire-casings, comprising a movable member having rolling engagement with the tread surface of said casing and bearing thereagainst with sufficient pressure to distort the casing, an indicating device having an element engaging the casing at a point adjacent said member, means supporting said element for movement generally normal to the element-engaging surface of the casing and against movement in other directions, and means for rotating the casing while in engagement with said member and element.

9. In mechanism for testing pneumatic tire-casings, comprising a movable member having rolling engagement with said casing and bearing thereagainst with sufficient pressure to distort the casing, an indicating device having an element engaging the casing at a point adjacent said member, means supporting said element for movement generally normal to the element-engaging surface of the casing and against movement in other directions, and means for rotating the casing while in engagement with said member and element.

10. In mechanism for testing rotatably mounted tire-casings, a roller, means for rotatably supporting said roller and holding it in contact with the outer surface of said casing with sufficient pressure to distort the casing, an indicating device including an element engaging the tread surface of the casing at a point having a fixed relation angularly about the casing-axis relative to said roller, and means supporting said element for movement radially of the casing and against movement axially of the casing.

11. In mechanism for testing rotatably mounted tire-casings, a roller, means for rotatably supporting said roller and holding it in contact with the outer surface of said casing with sufficient pressure to distort the casing, an indicating device including an element engaging a side wall of the casing at a point having a fixed relation angularly about the casing-axis relative to said roller, and means supporting said element for movement generally axially of the casing and against movement radially of the casing.

12. In mechanism for testing a rotatably mounted pneumatic tire-casing, two movable members engaging said casing at spaced points as the casing rotates, means for supporting each of said members for movement generally normal to the portion of the casing which it engages and against movement in other directions, and an indicating device for indicating relative movement of said two members as the casing rotates.

EDWIN W. PUMMILL.